United States Patent [19]
Komatsu

[11] Patent Number: 4,563,620
[45] Date of Patent: Jan. 7, 1986

[54] START-UP METHOD FOR SYNCHRONOUS MOTORS

[76] Inventor: Fumito Komatsu, 1632-12 Nomura, Ooazo Hiroaka,, Shiojini; Nagand-ken, Japan

[21] Appl. No.: 594,081

[22] Filed: Mar. 28, 1984

[30] Foreign Application Priority Data

Apr. 6, 1983 [JP] Japan ................................ 58-60586

[51] Int. Cl.$^4$ ........................................... H02K 29/00
[52] U.S. Cl. ................................... 318/138; 318/254; 318/439
[58] Field of Search ............... 318/138, 254, 439, 685, 318/696

[56] References Cited

U.S. PATENT DOCUMENTS

| | | | |
|---|---|---|---|
| 3,739,248 | 6/1973 | Wehde | 318/254 |
| 4,251,758 | 2/1981 | Pedersen et al. | 318/254 |
| 4,454,458 | 6/1984 | Holland | 318/138 |

Primary Examiner—David Smith, Jr.
Attorney, Agent, or Firm—Jordan and Hamburg

[57] ABSTRACT

The start-up method for synchronous motors of the present invention
applies to single-phase AC synchronous motors which comprise a stator armature with magnetic poles of alternate polarity and a permanent-magnet rotor magnetized in harmony with the poles of the stator armature, of which the stator armature is designed, for avoiding the start-up dead-point for the rotor, to allow the rotor to make spontaneous stop without bringing the magnetic-pole centers of armature and rotor on the same axial line of rotation;
and is characterized in that, during the start-up followed by speed-up effected by gradual increase in frequency of the AC supplied, the current supply is interrupted for a certain period after an arbitrary half-wave current has been fed, and that a continuous current supply is then resumed by first feeding a current in the opposite direction to that of the half-wave already supplied, thus assuring the rotor to begin to rotate in the normal prescribed direction.

3 Claims, 13 Drawing Figures

START-UP METHOD FOR SYNCHRONOUS MOTORS

BACKGROUND OF THE INVENTION

The present invention relates to a method of starting up a synchronous motor, specifically to a method of starting up a synchronous motor characterized in that, to a stator armature having its polarity converted with single-phase AC, the start-up current is supplied first in an amount corresponding to a half-wave and then interrupted, thus causing the rotor to oscillate in both the normal and reverse directions with the spontaneous stop position as the oscillation center and that, when the oscillation gets damped, the current supply is allowed to resume with the opposite half-wave, thus assuring the rotor to begin the rotate in the normal direction.

DESCRIPTION OF THE PRIOR ART

Some synchronous motors comprise a stator armature using single-phase AC for the generation of rotating magnetic field and a permanent-magnet rotor magnetized in harmony with the armature poles and are designed in such a way that the AC supplied to the stator armature is increased in frequency from a low to desired value either continuously or stepwise, thus allowing the rotor to be in keeping with the frequency increase up to the ultimate synchronous operation.

With such synchronous motors, when the current to the stator armature gets turned off, the rotor will stop with polar stability at the minimum magnetic-reluctance position (to be called the spontaneous stop position), dependent on the relative positional relation between the rotor and the coil of the stator armature.

Therefore, when re-start is tried with the rotor at the spontaneous stop position, no rotational force will be produced, i.e., the so-called start-up dead-point will be encountered, since the positional relation between the poles of rotor and stator armature corresponds to a straight line such as N-N and N-S directing toward the rotary shaft.

This unfavorable dead-point situation arises from the mechanism that the polar center of stator armature and the polar center of rotor at the spontaneous stop position coincide axially with each other. The dead-point may be avoided by shifting the spontaneous stop position of rotor from the axial position of the pole of stator armature if we apply a design that the end of the magnetic-pole core of stator armature is extended in one direction along the circumferential face of rotor or that the magnetic-pole core of stator armature is deformed so as to make the air gaps uneven.

Even such a synchronous motor as has been made free from effective start-up dead-point is still involved in a problem that the rotational direction is not constant since the direction of rotor rotation depends on the direction of the initial half-wave of the AC supplied for start-up.

A solution of the problem of variant rotational direction is feasible by use of a conventional technique in which a Hall element is used to detect the positional relation between the magnetic poles of armature and rotor, allowing the power supply to begin to supply such an AC as produces repulsive poles on the armature with respect to rotor poles, with a result that the rotor always begins to rotate in the normal direction. This technique is, however, unrealistic since the need for a detector circuit containing a Hall element makes the product synchronous motor expensive and since a space inside the motor need to be provided for incorporating the Hall element.

SUMMARY OF THE INVENTION

The object of the present invention is to offer a novel method of starting up a synchronous motor which eliminates the possibility of the rotor to start up in variant directions depending on the direction of the AC initially sent at start-up, i.e., which always allows the rotor to start up in the normal direction irrespective of the direction of the start-up current.

The start-up method of the present invention applies to synchronous motors which are designed in such a way that a stator armature is provided which produces magnetic poles with alternate polarity upon supply of single-phase AC, a permanent-magnet rotor is provided which has been magnetized in harmony with the magnetic poles of the stator armature, the stator armature is designed to allow the rotor to make spontaneous stop without the pole centers of the stator armature and rotor falling on the same axial line, and that the frequency of the AC supplied is gradually increased after start-up with resulting follow-up of the rotor rotation in frequency.

The start-up method of the present invention is characterized in that the start-up AC supplied is interrupted for a certain period after the initial half-wave has been fed, until the angular amplitude of the rotor oscillation which is repeated back and forth with the spontaneous stop position as the center of oscillation is reduced to an rotational angle in the range which is closer to the spontaneous stop position of rotor than to the central position of the magnetic pole of the stator armature, and that the interruption is followed by resumption of continuous AC supply in the opposite direction to that of the first half-wave already supplied.

BRIEF DESCRIPTION OF THE DRAWINGS

FIGS. 5, 6, and 7 illustrate an inner-rotor synchronous motor, of which FIG. 5 shows a section vertical to the rotary shaft, FIG. 6 shows a section along the rotary shaft, and FIG. 7 shows a partial section of the system minus the rotor;

DETAILED DESCRIPTION OF THE INVENTION

Description will first be made of a single-phase AC synchronous motor which utilizes the starting method of the present invention.

Figure 1:
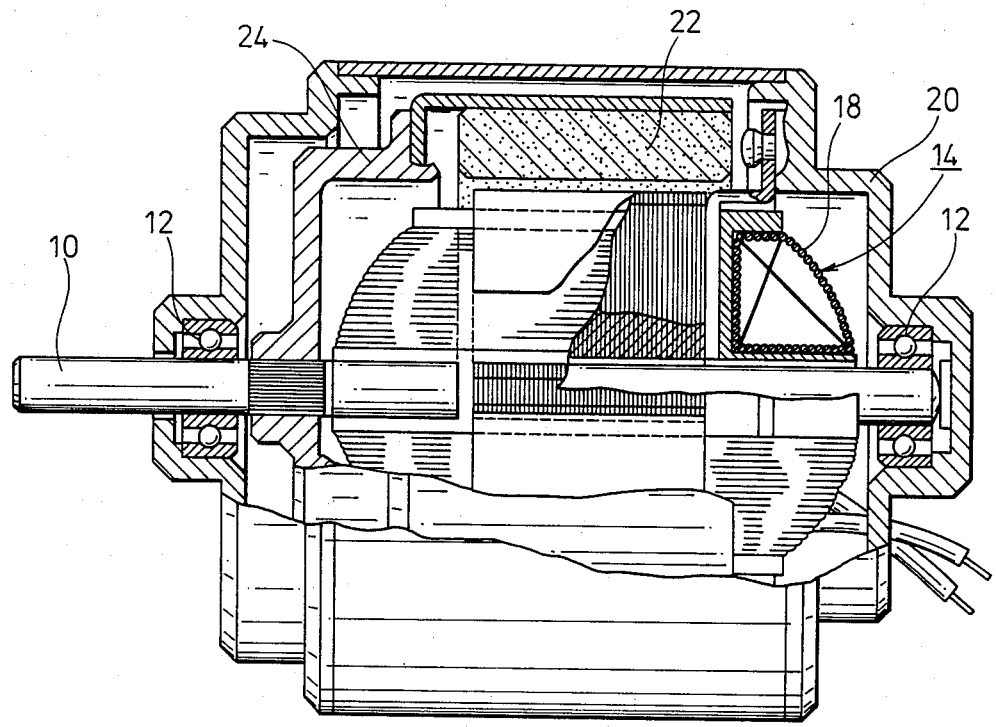
FIG. 1 is a side sectional view of an outer-rotor synchronous motor.

Referring to FIG. 1, a rotary shaft 10 is supported on bearings 12. A stator armature 14 comprises a cross-shaped core 16, one of whose magnetic paths has a coil 18 wound and the other serves merely as a magnetic pole. The stator armature 14, with the rotary shaft 10 inserted free, is fixed on a casing 20 and thus is not affected by the rotation of rotary shaft 10.

A permanent-magnet rotor 22 is magnetized to have 4 poles and is provided with a connecting cup 24 so as to rotate together with the rotary shaft 10.

Figure 2:
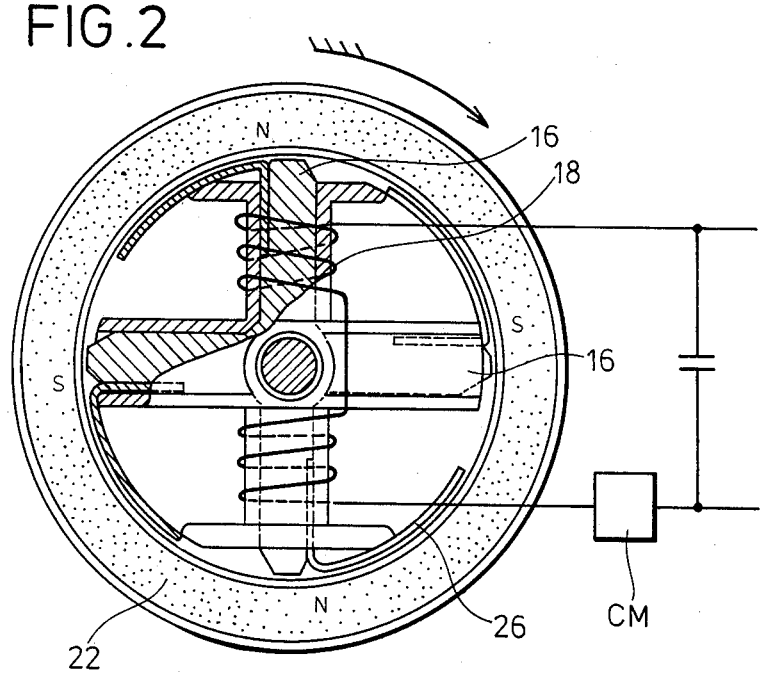
FIG. 2 illustrates a vertical section for FIG. 1.

The stator armature 14, as shown in FIG. 2, is provided with 4 poles and on one of a pair of two linear cores there is a coil 18 wound with different directions of winding for the halves of the core.

Extended sections 26 extend from each end of the cross-like core 16 along the arc of the permanent magnet rotor 22 in a direction opposite to the rotational direction of the rotor 22.

Figure 3:
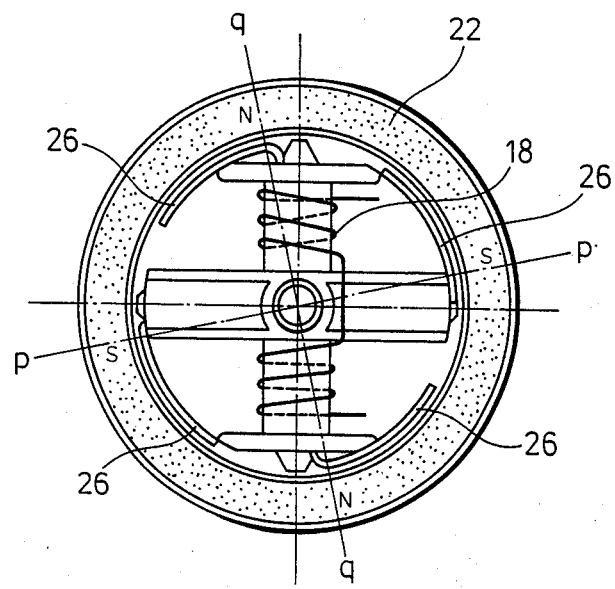
FIGS. 3 and 4 illustrate the relative positional relation between the poles of rotor and stator armature, of which FIG. 3 corresponds to the state of stop with no passage of current and FIG. 4 corresponds to the state at the start of current passage immediately followed by motor rotation.
Figure 4:
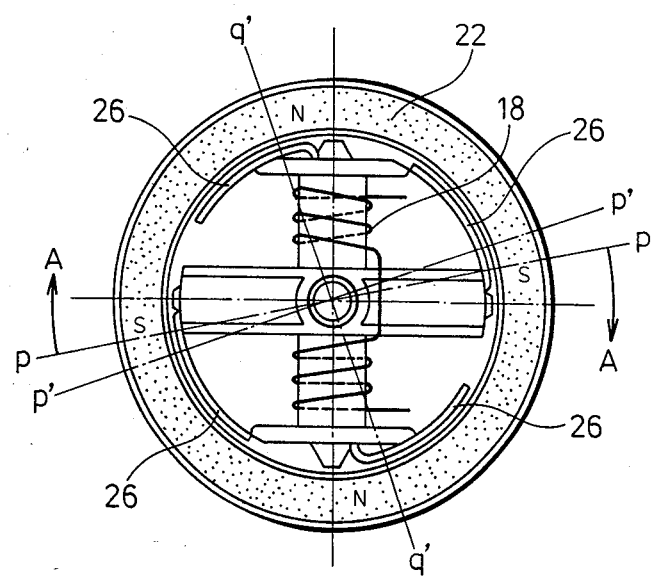

FIGS. 3 and 4 illustrate the action of the extended sections 26. In FIG. 3 the stator armature 14 has no passage of current through its coil 18, with the rotor at a stop, where each pole of the rotor 22 corresponds to the position (p,q), i.e., the spontaneous stop position, at which the magnetic reluctance of the system of core 16 and extended sections 26 is minimized.

When current gets supplied to the coil 18, as shown in FIG. 4, there will be evolved poles of the core 16 at positions (p',q') which are located slightly toward the anti-rotational direction of the rotor 22 relative to the spontaneous stop position (p,q) at which the core 16 corresponds to the poles of the rotor 22 at the spontaneous stop position. This shift of pole position brings the relative position of rotor 22 and core 16 at the start of rotation out of the positional relation of dead-point, eliminating the possibility that passage of current will produce polar balance causing unsuccessful motor start.

If the AC current applied at motor start-up is in such a timing that the stator armature can produce such poles as repulse the rotor poles, the rotor 22 will rotate in the normal direction A.

Synchronous motors of such structure as described above are supplied with AC current via a frequency converter CM controlled by a microcomputer; the frequency is gradually increased from an extremely low value at start-up up to a constant rated value or a value in a certain functional relation, where synchronous motor operation is maintained.

When a rotor made of ferrite ring is used on a synchronous motor with the above-described structure, the permanent-magnet magnetization applied on the outer-peripheral or circumferential section of the rotor should be of sine-wave distribution.

This magnetization is applied on the inner face of the rotor for the above example, since the rotor is used as an outer-rotor.

A motor designed with such magnetization operates with complete synchronization after the rotor has reached the state of synchronous rotation, may utilize the damping effect for eliminating unbalanced rotation and double- and triple-speed synchronizations, operates with fine adjustments, and gives the maximum energy efficiency.

Figure 5:
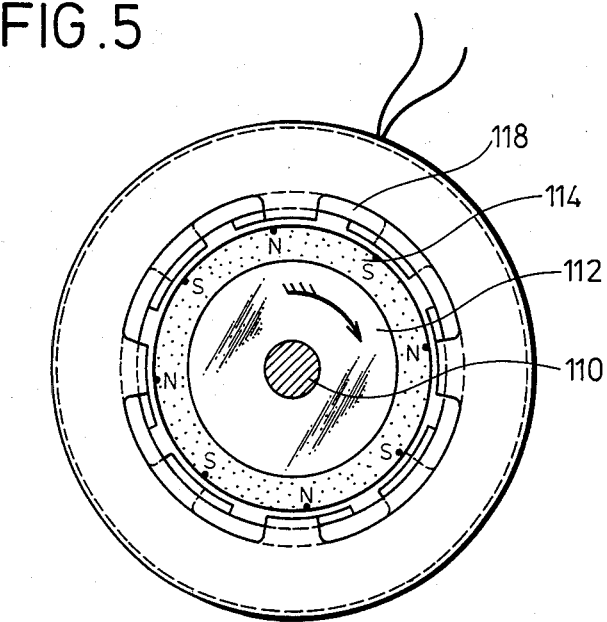
Figure 6:
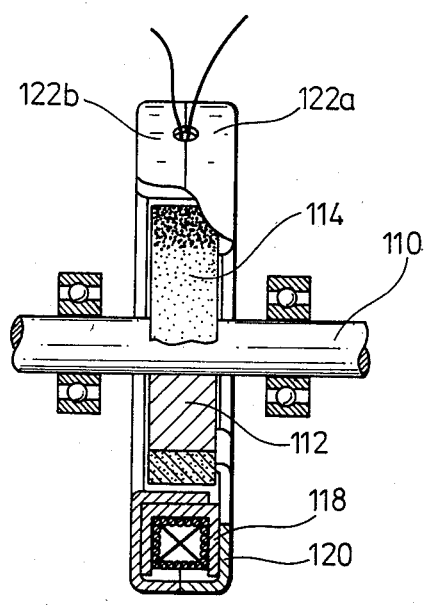
Figure 7:
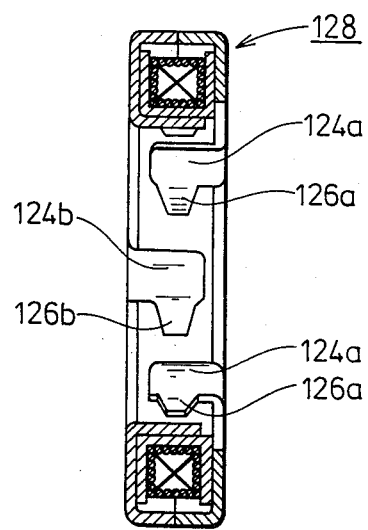

FIGS. 5, 6, and 7 refer to an example of synchronous motor using an inner rotor. A magnet fixing part 112 rotates together with a rotary shaft 110. An inner-rotor 114 is magnetized in 8-pole sine-wave distribution.

A bobbin 118 has a U-shaped cross-section with its opening toward outside and a coil 120 is wound in this opened groove.

Yokes 122a and 122b display the same action as the above-described coil 16. The right-side yoke 122a and the left-side yoke 122b, each equipped with 4 poles, are held together with the bobbin 118 contained, 90°-bent sections 124a and 124b and disposed alternately over the inner face of bobbin 118, and from each of 90°-bent sections 124a and 124b are provided in an arc form extended sections 126a and 126b in the opposite direction to that of rotation (arrow-indicated) of rotor 114; the provision of extended sections 126a and 126b is for avoiding the start-up dead-point. AC current is supplied via a frequency converter CM to the stator armature 128 comprising the bobbin 118, coil 120, and yokes 122a and 122b.

Figure 8:
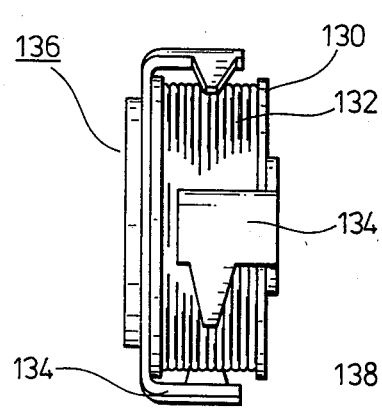
FIG. 8 is a side view of a stator armature.
Figure 9:
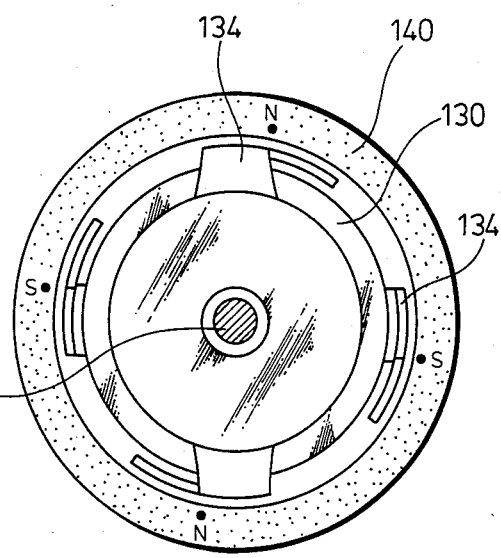
FIG. 9 is a front view of a system with the outer rotor positioned in relation to the stator armature.

Another arrangement illustrated in FIGS. 8 and 9 is available which is reverse to the arrangement for FIGS. 5, 6, and 7; an stator armature 136 consisting of a bobbin 130, a coil 132, and jokes 134 is set inside, a rotary shaft 138 is inserted free through this stator armature 136, an outer-rotor 140 capable of rotating together with the rotary shaft 138 is provided, and to this rotor 140 is applied sine-wave magnetization in harmany with the poles of the stator armature 136.

The above-described structure also is free from the problems of unbalanced rotation and double- and triple-speed synchronizations, leads to precise operation and displays the maximum energy efficiency.

Figure 10:
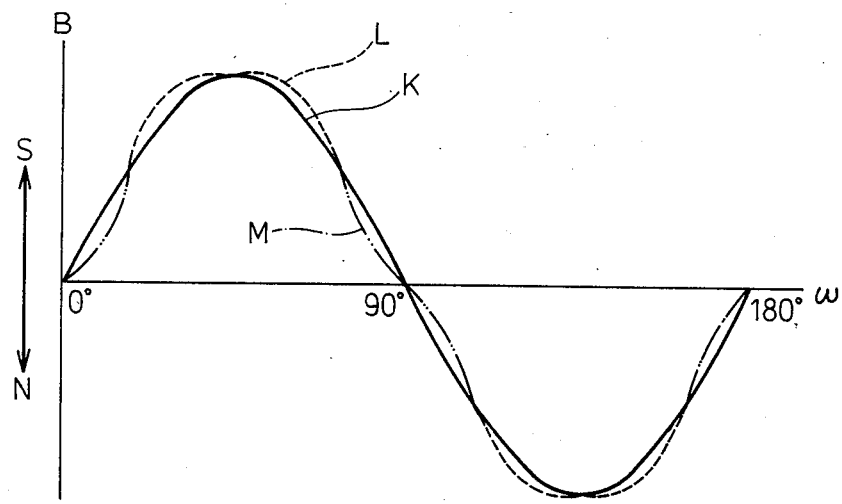
FIG. 10 is a graph indicating the pattern of rotor magnetization distribution.

In the case of a 4-pole rotor, the damping effect operates to eliminate the problem of unbalanced rotation when the magnetization corresponds to such a sine-wave flux-density curve (magnetic flux density B vs. circumferential angle ω curve) as give by K in FIG. 10. No problem is raised practically even when the magnetization corresponds to the dotted curve given by L. However, when the actual magnetization deviates from the sine wave in such a degree as the dotted line M, the synchronous operation is hard to be realized.

The application of the start-up method of the present invention is not restricted to those described above but is valid to any snychronous motors which are designed to have a deviation between the center of the pole of stator armature and the spontaneous stop position of rotor, with the start-up dead-point avoided.

Description will now be made on the start-up method for synchronous motors with the above-described structure.

Figure 11:
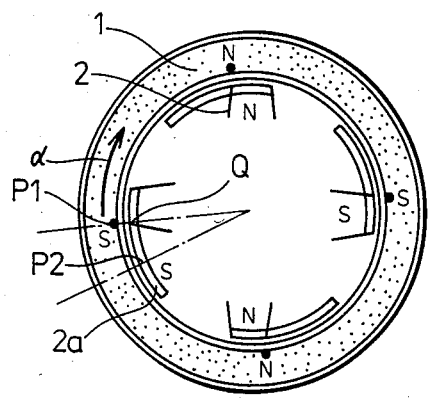
FIGS. 11 and 12 illustrate positional relations among the pole P1 of rotor 1, the spontaneous stop position Q of the core 2 of stator armature, and the center P2 of the magnetic pole.

It has already been described that, since the core 2 of stator armature is equipped with the extended section 2a, the rotor 1 will begin to rotate in the normal direction (indicated by the arrow α), as shown in FIG. 11, if at start-up the stator armature has its magnetic poles of the same polarity with the pole P1 of rotor.

Figure 12:
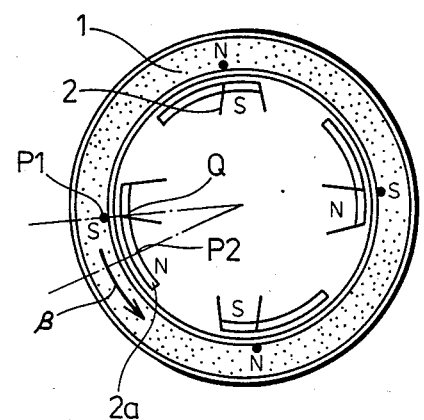
Figure 13:
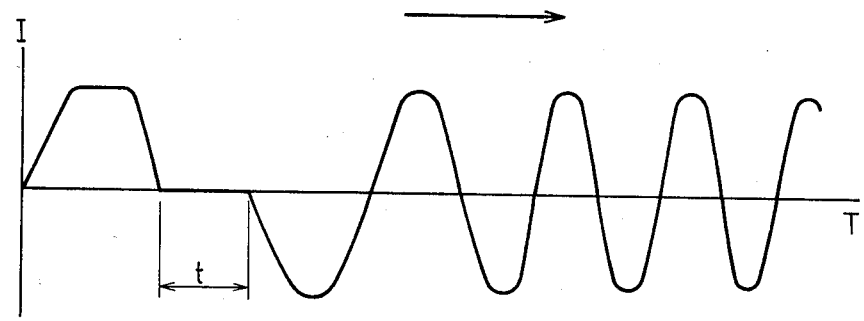
FIG. 13 is a graph for the AC supplied.

On the contrary, if the stator armature has its magnetic pole of the different polarity from that of rotor pole P1, the rotor 1 will be drawn back in the reverse direction (indicated by the arrow β) as shown in FIG. 12, passing the magnetic-pole center P2 with the reverse direction kept; while the polarity of the stator armature is not changed after the passage, the rotor pole P1 will again be drawn back in the normal direction, and thus, the rotor pole P1 continues to be in a damped rotary oscillation until the pole P1 ceases to oscillate at the pole center position P2.

On the other hand, if the stator armature changes its polarity when the pole center P2 has been passed in the reverse direction, a repulsion will sometimes cause the rotor 1 to start up in the reverse direction.

To eliminate these defects, a blank period t with no current passage is set immediately after the first half-wave of start-up current has been fed. When the first half-wave current has been such as produces a pole on the stator armature different in polarity from the rotor pole P1, the time of current resumption, corresponding to the minimum duration required of blank period t, should be when the rotor pole, kept in a damped oscillation near the spontaneous stop position after the current interruption, has its oscillatory amplitude brough into the inside closer to the spontaneous stop position Q than to the pole center P2; the duration of blank period t may be long without limit as long as the current resumption is begun with the second half-wave current in the reverse direction to that of the first half-wave current. This is because, when the rotor pole P1, after the current interruption, has been brought to stop at the spontaneous stop position Q of the stator armature, it is always positioned at a location shifted from the pole center P2 in the normal direction.

As seen from the above description, a modification of start-up method is feasible in which the first half-wave current is supplied when the motor operation is over and the rotor has stopped its rotation, the second half-wave current being supplied at the time of re-start.

The setting of a blank period longer than a certain period between the first and second half-waves is effective for keeping the start-up in the normal direction, as seen from the following description. When the first half-wave current is in such a direction as makes the pole of stator armature the same in polarity as the rotor pole P1, the rotor is permitted to continue rotation in the normal direction, the current interruption brings the rotor to stop at the spontaneous stop position Q of stator armature, and the current resumption with a current in the opposite direction after the blank period results in a rotation in the normal direction since it is designed that the stator armature in the last position will have poles of polarity different from that for the stator armature in the previous position.

On the other hand, when the first half-wave current is in such a direction as makes the pole of stator armature different in polarity from the rotor pole P1, the rotor pole is caused to be drawn back toward the pole center of stator armature, the current interruption allows the rotor to be kept in a damped oscillation across the spontaneous stop position of the stator armature, and the application of the second half-wave current when the rotor pole has stopped at the spontaneous stop position Q or while it is in a damped motion in a region lying in the normal direction relative to the pole center P2, will make the armature pole the same in polarity as the rotor pole, initiating the rotation of the rotor in the normal direction.

It should be noted that it is only the direction of the first half-wave current that is to be taken into consideration; thus, any of wave forms such as sine wave, keystone wave, rectangular wave, and triangular wave are available.

After the motor has entered the synchronous rotation state, it is possible to keep the rotation at the constant speed or to change the rotation to any arbitrary speeds. The control of rotational speed is effected by variation of the frequency of the AC supplied.

It is also applicable to adopt high voltages at start-up or to keep the voltage during stable operation at low voltages.

In summary, the present invention assures normal-direction start-up of rotor by use of a simple mechanism that a half-wave current in any directions is first supplied, the current supply is then interrupted for a certain period, and that the current resumption is begun with a single-phase AC different in direction from the initially applied current.

I claim:

1. In a start-up method for synchronous motors having a stator armature which produces magnetic poles with alternate polarity upon supply of single-phase AC, and a permanent-magnet rotor which has been magnetized in harmony with the magnetic poles of the stator armature, the stator armature being designed to allow the rotor to make a spontaneous stop without the pole centers of the stator armature and rotor falling on the same axial line of rotation, the method including gradually increasing the frequency of the AC supplied after start-up with resulting follow-up of the rotor rotation in frequency;

the improvement comprising interrupting the start-up AC supplied for a certain period after the initial half-wave has been fed, until the angular amplitude of the rotor oscillation which is repeated back and forth with the spontaneous stop position as the center of oscillation is reduced to a rotational angle in the range which is closer to the spontaneous stop position of rotor than to the central position of the magnetic pole of the stator armature, and following the interruption with resumption of continuous AC supply in the opposite direction to that of the first half-wave already supplied.

2. A start-up method for synchronous motors according to claim 1 comprising the initial half-wave current at the time of start-up.

3. A start-up method for synchronous motors according to claim 1 comprising supplying the initial half-wave current after the end of operation.

* * * * *